UNITED STATES PATENT OFFICE 2,512,771

OPERATING FLUIDS BASED ON ACETALS

Frank J. Glavis, Elkins Park, and Harry T. Neher, Bristol, Pa., assignors to Röhm & Haas Company, Philadelphia, Pa., a corporation of Delaware No Drawing. Application September 17, 1947, Serial No. 774,671

8 Claims. (Cl. 252—56)

This invention concerns compositions of matter which are particularly adapted to the transmission of power hydraulically. These compositions may be employed as fluids for operating mechanisms, such as brakes, lifting devices, recoil systems, shock absorbers, and the like. They are also useful as lubricants.

The compositions of this invention comprise acetals of aliphatic monohydric alcohols of three to twelve carbon atoms in which there is dissolved an acrylic resin or acrylic type polymer in an amount sufficient to impart to said compositions a consistency suitable for a given application. Useful fluids with viscosities from 3 centistokes to 50 centistokes at 210° F. are thus available.

The acetals which are used in preponderant proportion are compounds of the formula

wherein R is an aliphatic group containing three to twelve carbon atoms. It is inherent in such compounds that R is free of highly reactive groups, including reactive hydrogen atoms. The group R may be an alkyl group, such as isopropyl, butyl, hexyl, octyl, decyl, or dodecyl, ethylhexyl, capryl, or the like, or it may be an unsaturated aliphatic hydrocarbon group such as allyl, methallyl, or crotyl, or it may be a group having inert substituents such as ether groups or nitrile groups. The ether alcohols from ethylene or propylene glycol are particularly interesting for forming true acetals which may serve as components in the preparation of the compositions of this invention. Thus, R may be a group such as ethoxyethyl, butoxyethyl, octoxyethyl, ethoxypropyl, butoxypropyl, octoxypropyl, butoxyethoxyethyl, or butyoxypropoxypropyl. The subclass of acetals thus formed is particularly useful because of its wide range of solubilities for acrylic polymers, low freezing points, high boiling points, and miscibility with other liquids.

These latter acetals have the formula

wherein R' is an alkyl group preferably from ethyl to octyl, M is an ethylene or propylene group, and $x$ is a small integer, commonly from one to five.

When compositions are desired which remain fluid at low temperatures, there is preferably used propyl, allyl, or butyl acetal either as the sole acetal or as one of a mixture of acetals, including acetals of longer chain length. With increasing length of chain there is some tendency for an increase in the slope of curves for viscosity v. temperature. Branching of the chain helps to lower the congealing or freezing temperatures. With increasing length of chain, there is usually an increase in capacity for lubrication and a rise in the temperature at which freezing occurs. For these reasons mixtures of acetals are often desirable in order to provide the balance of properties required.

The acrylic-type polymers, which may be used, include on the one hand the soluble polymeric esters of acrylic acid and of methacrylic acid, particularly esters from saturated aliphatic monohydric alcohols of four to sixteen carbon atoms, such as butyl, sec.-butyl, amyl, hexyl, capryl, 2-ethylhexyl, octyl, decyl, dodecyl and cetyl. On the other hand, within the term "acrylic resin" there are included copolymers of acrylic esters with compatible ethenoids copolymerizable therewith, such as styrene, vinyl acetate, vinyl propionate, or vinyl isobutyl ether. It is interesting to note the solubilizing influence of the acrylic ester portion on ethenoids, the polymers of which by themselves may be practically insoluble in the acetals shown above. In general, polymers prepared from esters of acrylic or methacrylic acid and saturated monohydric aliphatic alcohols of four to sixteen carbon atoms are rather freely soluble in the acetals of the above formula. This makes possible a choice of acetal and of acrylic polymer for compositions to meet highly special and critical conditions and permits the adaptation of the compositions of this invention to many and variable conditions.

The acrylic polymers may be widely varied as to the extent of polymerization. If they are polymerized to only short chains, it will be evident that higher concentrations of polymer will be required to reach a given viscosity than when polymerization is carried to yield longer chains. On the other hand, the short-chain polymers usually do not raise the congealing temperature of the composition while some very long-chained polymers may slightly raise this temperature. Short-chained polymers are not sensitive to shear whereas many long-chained polymers may be. Thus, in situations in which shear is a factor, relatively short-chained polymers are to be recommended insofar as shear may be a limiting or controlling factor. These and comparable factors are taken into account in the selection of polymer, both as to kind and as to extent of polymerization in order to provide optimum results for any prescribed application.

As is known, the relatively short-chained polymers, for example, those with average molecular weights below five to ten thousand, are formed under vigorous conditions of polymerization, including high concentrations of catalyst and elevated temperatures. The long chain polymers, for example, those having apparent molecular weights above twelve to fifteen thousand, on the other hand are obtained with low or moderate concentrations of catalyst, with low or moderate temperatures, from high concentrations of monomer in solvent, if it is desired to use a solvent, and other conditions which are known to promote long chain formation.

The polymers which are desirably used in the compositions of this invention are derived from esters of the formula $$CH_2=C(R_1)COOR_2$$

wherein $R_1$ is hydrogen or the methyl group and $R_2$ is the residue of a saturated monohydric aliphatic alcohol which contains at least four carbon atoms, preferably from four to sixteen carbon atoms. Polymers of such esters may be used or copolymers of such esters with each other or with other polymerizable ethenoids, the proportion of acrylic ester being sufficient to ensure solubility of such copolymer in the acetals.

Compositions of this invention may be prepared to contain about 3% up to about 50% of one or more of the above-described polymeric materials or, preferably, 5% to 20% of such polymeric material dissolved in an acetal as defined above or in a mixture of such acetals. The useful acetals include mixed acetals; i. e., those derived from two different alcohols. The presence of the polymer imparts a suitable viscosity or consistency to the composition with retention of favorable viscosity-temperature relationships.

Although the defined acetals are generally thin fluids at ordinary temperatures, they supply lubricating action. Under the conditions in which bearings immersed in thin hydrocarbon oils will seize in very short times in tests for lubricating properties, the defined acetals prevent seizure and excessive wear.

By way of example, the acetal from butoxyethanol permitted wear of a test bearing in a Falex tester at the rate of 23 arbitrary units (teeth) per hour under a 100-lb. load. Addition of 5% of butyl polymethacrylate to this acetal reduced the rate of wear to 13 such units per hour. Addition thereto of 5% of tricresyl phosphate reduced the rate of wear to 11 units per hour. A solution of 13% of poly 2-ethylhexyl methacrylate and 5% of tricresyl phosphate in butoxyethyl acetal gave a rate of wear of only 4 units per hour under a 100-lb. load.

In another set of tests the acetal from dodecyl alcohol permitted wear at the rate of 5 units per hour. Addition thereto of octyl polyacrylate reduced this rate below 3 units per hour. A mixture of dodecyl acetal, butyl acetal, and octyl polymethacrylate likewise gives a low rate of wear in lubrication tests, below 3 units per hour.

Tests of the acetals for their action on synthetic rubbers are generally favorable. Specimens of rubbers were soaked in compositions of this invention for a week at 160° F. In the case of specimens of copolymers from butadiene and acrylonitrile, 2-ethylhexyl acetal, as a typical acetal, caused an increase of volume of 5% without causing a loss in hardness. A specimen of a neoprene-type rubber swelled 6%, likewise without loss of hardness.

Some of the acetals studied had a slight acidity resulting from the method of preparation. When this acidity was neutralized with a trace of triethanolamine, the acetals were free from corrosive action on metals.

Compositions based on acetals have tolerance for moisture and also for hydrocarbon oils. They are, therefore, not rendered useless by accidental contamination with such substances. Likewise, since they have considerable tolerance toward other types of hydraulic fluids, they are not rendered useless by portions of such other fluids remaining after a system has been drained for refilling with the compositions of this invention.

The fluids of this invention are well retained by the usual hydraulic system and lack any marked tendency to seep through the usual clearances in operating mechanisms. If, through slow evaporation, acrylic polymer is deposited, such deposit does no harm as it is soft and usually unctuous.

Typical compositions together with some of their properties are shown in the following examples.

EXAMPLE 1

A mixture of 80 parts of allyl acetal and 20 parts of a butyl polymethacrylate gave a clear liquid having a viscosity of 10 centistokes at 210° F. and of 21.5 cs. at 100° F. The polymer used was of medium chain length as indicated by the viscosity of a 10% solution of it in toluene being 11.8 cs. at 100° F. The composition of allyl acetal and butyl polymethacrylate remained fluid at −105° F.

The temperature-viscosity behavior of the compositions of this invention may be compared through a coefficient, $$C_{t_2}^{t_1}$$

relating viscosities at two temperatures, $t_1$ and $t_2$, usually 210° F. and 100° F. The value of this coefficient is given by the equation $$C_{t_2}^{t_1}=1-\frac{\text{viscosity at }t_1}{\text{viscosity at }t_2}$$

The lower values indicate more favorable relations of viscosity and temperature.

Comparisons may also be made by choosing solutions giving the same viscosity at a selected temperature, usually 210° F., and determining the slopes of curves for temperature v. viscosity. Curves obtained on ASTM kinematic viscosity charts are particularly useful for determining slopes and making comparisons. Slopes thus determined are herein referred to as "ASTM slopes."

The ASTM slope for the above composition is 0.30 and the value of $$C_{100}^{210}$$

is 0.54.

EXAMPLE 2

A mixture of the same polymer used in Example 1 was made with butyl acetal. A solution containing 20% of the polymer gave a viscosity of 10 cs. at 210° F. and of 26 cs. at 100° F. The solution did not solidify when stored at −105° F. The ASTM slope is 0.36.

EXAMPLE 3

A solution of 45 parts of a copolymer of equal parts of octyl methacrylate and decyl methacrylate in 55 parts of a light hydrocarbon oil having a viscosity of 5 cs. at 210° F. was added to butoxyethoxyethyl acetal until the resulting solution had a viscosity of 10 cs. at 210° F. This solution contained 14.7% of the hydrocarbon solution of the copolymer. The solution in the acetal had a viscosity of 26 cs. at 100° F. It congealed at about −70° F. The ASTM slope is 0.36.

EXAMPLE 4

(a) A solution of the butyl polymethacrylate used in Examples 1 and 2 was made in butoxyethyl acetal. A concentration of 10.7% of polymer gave a solution having a viscosity of 10 cs. at 210° F. and of 28 cs. at 100° F. The solution remained fluid when stored at −105° F.

(b) A solution of a butyl methacrylate polymer which gave a 10% solution in toluene with a viscosity of 8.6 cs. at 100° F. was prepared with the same acetal. At a concentration of 12.7% of polymer, a viscosity of 10 cs. at 210° F. was reached. This solution had a viscosity of 25 cs. at 100° F. The ASTM slope is 0.35 and the coefficient $$C_{100}^{200}$$

has the value 0.60. The solution remained fluid at −105° F.

(c) A polymer of octyl acrylate, giving a viscosity of 2.8 cs. for a 10% solution in toluene, was taken up in butoxyethyl acetal. At 19.2% of polymer, the resulting solution had a viscosity of 10 cs. at 210° F. This solution had a viscosity of 28 cs. at 100° F. The ASTM slope is 0.39 and the $$C_{100}^{210}$$

value is 0.64.

(d) A polymer of octyl methacrylate, giving a 10% toluene solution with a viscosity of 5.6 cs. at 100° F., was dissolved in butoxyethyl acetal. A 13% solution of this polymer had viscosities of 10 cs. at 210° F. and 24 cs. at 100° F. The ASTM slope is 0.34 and the value of $$C_{100}^{210}$$

is 0.58.

(e) A 14% solution of the copolymer described in Example 3 in butoxyethyl acetal had viscosities of 10 cs. at 210° F. and 26 cs. at 100° F. The ASTM slope is 0.36 and $$C_{100}^{210}$$

is 0.62.

EXAMPLE 5

(a) A solution of the above-described copolymer in oil, as used in Examples 3 and 4e, was made in 2-ethylhexyl acetal. The composition containing 17% of this preparation had viscosities of 10 cs. at 210° F. and 31 cs. at 100° F., corresponding to an ASTM slope of 0.42 and a $$C_{100}^{210}$$

value of 0.68. The solution did not freeze when stored at −105° F.

(b) A copolymer of cetyl methacrylate and butyl methacrylate in a ratio of 35 to 65 was dissolved in 2-ethylhexyl acetal. At 8.8% concentration the solution had a viscosity of 10 cs. at 210° F. and of 26 cs. at 100° F. The ASTM slope is 0.36. This solution gels at −105° F. since, in the ratio above set forth, the copolymer is not completely soluble in this particular acetal at this lower temperature.

(c) A copolymer of cetyl methacrylate and styrene in a ratio of 7 to 3 was dissolved in 2-ethylhexyl acetal. At 9.0% concentration, the solution had a viscosity of 10 cs. at 210° F. and of 31 cs. at 100° F., corresponding to a $$C_{100}^{210}$$

value of 0.68 and an ASTM slope of 0.42. This copolymer was not completely soluble at −105° F.

EXAMPLE 6

(a) A polymer of dodecyl methacrylate, giving a viscosity of 5.4 cs. at 100° F. in a 10% toluene solution, was dissolved in 2-ethylhexyloxyethyl acetal to give a 12% solution, having a viscosity of 10 cs. at 210° F. and of 34 at 100° F. The ASTM slope is 0.45. The solution did not solidify under storage at −105° F.

(b) A solution of a copolymer of octyl and decyl methacrylates in a 6:4 ratio in a hydrocarbon oil, as referred to above, was made in 2-ethylhexyloxyethyl acetal. At 10.7% of the copolymer, the viscosity at 210° F. was 10 cs. and at 100° F. 31 cs. The ASTM slope is 0.42. The solution did not freeze at −105° F.

EXAMPLE 7

An acetal from 2-ethylhexyl oxypolyethyleneoxy ethanol in which five ether groups were present was used to dissolve butyl polymethacrylate. The solution, adjusted to 5% of the polymer, had viscosities at 100° F. and 210° F. of 52 cs. and 10 cs. respectively. The $$C_{10}^{21}$$

value is 0.81.

For many application fluid compositions adjusted to give viscosities from 5 centistokes to 15 centistokes at 210° F. are most generally useful. Both more viscous and less viscous fluids are, however, frequently desired and are available from the essential components of the compositions prepared according to this invention. For example, fluids with a viscosity of 3 cs. at 210° F. may be prepared for use at extremely low temperatures while viscosities of 40 to 50 cs. at 210° F. are useful for fluids used at elevated temperatures and under severe loads.

EXAMPLE 8

Solutions of polymers of butyl methacrylate which were prepared to have different average molecular weights were made in a variety of acetals. The viscosities of these solutions were determined at 210° F. and 100° F. and from these data viscosity indexes were calculated. Typical data are presented in the table.

*Table*

| Acetal | Concn. of Polymer | Viscosities in cs. | | V. I. | $C_{100}^{210}$ |
| --- | --- | --- | --- | --- | --- |
| | | 210° F. | 100° F. | | |
| | Per cent | | | | |
| Isopropyl | 13.0 | 6.4 | 12.9 | 225 | 0.50 |
| Butyl | 5.0 | 3.0 | 5.8 | 288 | 0.48 |
| Octyl | 3.5 | 3.0 | 6.5 | 269 | 0.54 |
| Do | 17.0 | 47.0 | 501.0 | 124 | 0.91 |
| 2-Ethylhexyl | 5.0 | 4.1 | 11.3 | 252 | 0.64 |
| Do | 19.0 | 29.5 | 295.0 | 123 | 0.90 |

EXAMPLE 9

(a) A solution of 5% of a polymer of octyl methacrylate was made in 2-ethylhexyl acetal. It had a viscosity of 5.1 cs. at 210° F. and of 14.7 cs. at 100° F. The viscosity index is 222.

(b) A solution of 2% of the same polymer was made in a mixture of dodecyl acetal, tetradecyl acetal, and mixed dodecyl-tetradecyl acetal, as obtained from a commercial alcohol containing about 3 parts of dodecyl alcohol to 1 part of tetradecyl alcohol. It had a viscosity of 3.7 cs. at 210° F. and of 11.5 cs. at 100° F. The viscosity index of this solution is 220.

EXAMPLE 10

A solution of 5% of a polymer of butyl methacrylate was made in a butoxyethyl acetal. It had a viscosity of 4.2 cs. at 210° F. and of 9.8 cs. at 100° F. The viscosity index of this solution is 276.

In compositions based on a suitable acetal and a defined acrylic polymer there may be admixed in minor proportion an oil such as a petroleum oil or a glyceride. If desired, film-forming agents, anti-corrosion agents, anti-oxidants, detergents, or other additives or dyes may be used in the compositions of this invention.

These compositions are stable under the usual conditions of storage and employment. They remain homogeneous at low or high temperatures. They have effective lubricating properties and do not seep through the usual clearances of operating parts. The compositions are not sensitive to changes resulting from such vaporization as may normally occur, nor to moisture, nor to contamination with other lubricants, nor to other hydraulic fluids. They permit addition of "make-up" fluid without separation of a component. By suitable selection of components compositions can be prepared to meet many exacting requirements and many combinations of requirements.

We claim:

1. As a new composition of matter, in preponderant proportion an acetal of the formula $$ROCH(CH_3)OR$$

wherein R is an aliphatic hydrocarbon group which contains three to twelve carbon atoms, having dissolved therein in minor proportion a polymer from esters of the formula $$CH_2=C(R_1)COOR_2$$

wherein $R_1$ is selected from the class consisting of hydrogen and the methyl group and $R_2$ is the hydrocarbon residue of a saturated monohydric aliphatic alcohol which contains four to sixteen carbon atoms, the amount of polymer present in said solution being 3% to 50% of the composition and sufficient to impart a viscosity of 3 to 50 centistokes at 210° F.

2. As a new composition of matter, a major proportion of an acetal of the formula $$ROCH(CH_3)OR$$

wherein R is an aliphatic hydrocarbon group which contains three to twelve carbon atoms and a lesser proportion of a polymer dissolved therein, said polymer being derived from an ester of the formula $$CH_2=C(CH_3)COOR_2$$

wherein $R_2$ is the hydrocarbon residue of a saturated monohydric aliphatic alcohol which contains four to sixteeen carbon atoms, said polymer being dissolved in said acetal, the amount of polymer present in said solution being 3% to 50% of the composition and sufficient to impart thereto a viscosity of 3 to 50 centistokes at 210° F.

3. As a new composition of matter, a solution of a polymer from esters of the formula $$CH_2=C(CH_3)COOR_2$$

wherein $R_2$ is the hydrocarbon residue of a saturated monohydric aliphatic alcohol which contains four to sixteen carbon atoms in an acetal of the formula $$ROCH(CH_3)OR$$

wherein R is an aliphatic hydrocarbon group of three to twelve carbon atoms, the proportion of polymer present being 5% to 20% of the composition and sufficient to impart to the solution a viscosity of 5 to 15 centistokes at 210° F.

4. As a new composition of matter, an acetal of the formula $$ROCH(CH_3)OR$$

wherein R is an aliphatic hydrocarbon group which contains three to twelve carbon atoms, having dissolved therein in minor proportion a polymer of butyl methacrylate, the amount of said polymer being 3% to 50% of the composition and sufficient to impart to the solution thereof in said acetal a viscosity of 3 to 50 centistokes at 210° F.

5. As a new composition of matter, an acetal of the formula $$ROCH(CH_3)OR$$

wherein R is an aliphatic hydrocarbon group which contains three to twelve carbon atoms, having dissolved therein in minor proportion a polymer from octyl methacrylate, the amount of said polymer being 3% to 50% of the composition and sufficient to impart to the solution thereof in said acetal a viscosity of 3 to 50 centistokes at 210° F.

6. As a new composition of matter, a solution in 2-ethylhexyl acetal of a polymer of an ester of the formula $$CH_2=C(CH_3)COOR_2$$

wherein $R_2$ is the hydrocarbon residue of a saturated monohydric aliphatic alcohol of four to sixteen carbon atoms, the amount of polymer present in the solution being 3% to 50% of the composition and sufficient to impart to the solution thereof in said acetal a viscosity of 3 to 50 centistokes at 210° F.

7. The composition of claim 6 wherein the polymer is butyl polymethacrylate.

8. The composition of claim 6 wherein the polymer is octyl polymethacrylate.

FRANK J. GLAVIS.
HARRY T. NEHER.

REFERENCES CITED

The following references are of record in the file of this patent:

UNITED STATES PATENTS

| Number | Name | Date |
|---|---|---|
| 2,036,304 | Seymour | Apr. 7, 1936 |
| 2,091,627 | Bruson | Aug. 31, 1937 |
| 2,321,557 | Sussman | June 8, 1943 |
| 2,382,931 | Woodhouse | Aug. 14, 1945 |
| 2,396,192 | Morgan | Mar. 5, 1946 |
| 2,408,983 | Kollen | Oct. 8, 1946 |